United States Patent
Riksheim et al.

(10) Patent No.: US 9,785,893 B2
(45) Date of Patent: Oct. 10, 2017

(54) PROBABILISTIC SEARCH AND RETRIEVAL OF WORK ORDER EQUIPMENT PARTS LIST DATA BASED ON IDENTIFIED FAILURE TRACKING ATTRIBUTES

(75) Inventors: Jon Riksheim, Boulder, CO (US); German A. Bogomolni, Mountain House, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1761 days.

(21) Appl. No.: 11/860,915

(22) Filed: Sep. 25, 2007

(65) Prior Publication Data

US 2009/0083250 A1 Mar. 26, 2009

(51) Int. Cl.
*G06Q 10/06* (2012.01)
(52) U.S. Cl.
CPC .................... *G06Q 10/06* (2013.01)
(58) Field of Classification Search
CPC .............. G06Q 10/06; G06Q 10/20
USPC ....................................... 705/8, 28
See application file for complete search history.

(56) References Cited

U.S. PATENT DOCUMENTS

| 5,287,267 | A  | * | 2/1994  | Jayaraman   | G06Q 10/06  |
|           |    |   |         |             | 705/28      |
| 5,596,712 | A  | * | 1/1997  | Tsuyama     | G06F 11/2257|
|           |    |   |         |             | 714/26      |
| 6,473,659 | B1 | * | 10/2002 | Shah        | G06F 11/2242|
|           |    |   |         |             | 382/141     |
| 6,609,217 | B1 | * | 8/2003  | Bonissone   | G06F 11/2257|
|           |    |   |         |             | 714/26      |
| 6,634,000 | B1 | * | 10/2003 | Jammu       | B61L 15/0081|
|           |    |   |         |             | 714/26      |
| 6,895,404 | B2 |   | 5/2005  | Rowley      |             |
| 7,707,058 | B2 | * | 4/2010  | Suermondt   | G06Q 10/06  |
|           |    |   |         |             | 705/7.25    |
| 8,255,811 | B2 |   | 8/2012  | Lynn et al. |             |
| 2002/0065749 | A1 | * | 5/2002 | Ikeda      | G05B 23/0283|
|           |    |   |         |             | 705/28      |
| 2002/0116246 | A1 | * | 8/2002 | Wippersteg | G06Q 10/06  |
|           |    |   |         |             | 705/305     |
| 2002/0161674 | A1 | * | 10/2002| Scheer     | G06Q 10/087 |
|           |    |   |         |             | 705/28      |
| 2007/0130144 | A1 |   | 6/2007 | Banks      |             |
| 2008/0055326 | A1 |   | 3/2008 | Du et al.  |             |
| 2009/0049165 | A1 | * | 2/2009 | Long       | H04L 41/046 |
|           |    |   |         |             | 709/223     |

\* cited by examiner

*Primary Examiner* — Talia Crawley
(74) *Attorney, Agent, or Firm* — Kilpatrick Townsend & Stockton LLP

(57) ABSTRACT

This disclosure describes, generally, methods and systems for creating dynamic subsets of larger equipment parts lists (EPLs). For example, a method may include receiving a search request that includes an associated failure code and a target asset. The method might further include providing an EPL for the asset type, and retrieving sub-lists of the EPL based on previous search requests which are associated with the failure code for the asset type. The method may further predict which one of the plurality of sub-lists has the highest probability of being associated with the failure code for the asset type and might present the predicted sub-list of the EPL to a user.

20 Claims, 7 Drawing Sheets

| EPL Item Keys | | Failure Tracking Keys | | Count |
|---|---|---|---|---|
| EPL ID | Item ID | Code Type | Code ID | # of Occurrences |
| ... | ... | Problem, Cause, Resolution | ... | ... |

FIG. 4

PROBABILISTIC SEARCH AND RETRIEVAL OF WORK ORDER EQUIPMENT PARTS LIST DATA BASED ON IDENTIFIED FAILURE TRACKING ATTRIBUTES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to asset lifecycle management, and more particularly to maintenance management by generating lists of needed items needed to complete identified maintenance and/or repairs based on usage of the items within the generated lists.

BACKGROUND OF THE INVENTION

Presently, in order for a technician or other professional to locate parts, supplies and/or equipment for a work order, the technician is required to browse through a parts or equipment catalog. The catalog may be in a book form or in an electronic form. When the catalog is in an electronic form the technician may be able to perform "key-word" searches in order to facilitate locating the desired part or equipment.

Often the catalog is broken down into multiple smaller sub-catalogs for easier searching. The catalogs may also be categorized by an asset type (e.g., trucks, cars, etc.). Nonetheless, these catalogs can be cumbersome and difficult to use, and often only include a single master catalog without any subdivisions. Even though key-word searching can speedup the search process, the technician is still often throwing out a large net and hoping to find the item they are looking for.

Current work order management system also provide for failure analysis. Such analysis may include the frequency that a part needs to be replaced, or the frequency that a certain piece of equipment breaks down. This information can then be used to identify parts and/or equipment that are prone to failure, or generate statistics such as "mean time between failure" for certain parts and/or equipment. However, these statistical reports are typically only used after a work order has been completed, and do not attempt to enhance the searching process. Accordingly, these and other problems are addressed by the present invention.

BRIEF SUMMARY OF THE INVENTION

Embodiments of the invention provide methods, systems and apparatus for creating dynamic subsets of larger parts lists. The parts lists and work orders may be generated based on various failure codes.

Various sets of embodiments provide methods, systems, and software products. Certain methods of the invention might implement user interfaces of the invention, might be implemented as software programs and/or might be implemented as instructions to be performed by a computer system. Similarly, systems of the invention can include computers configured with software (e.g. sets of instructions) executable to perform methods of the invention and/or to implement user interfaces of the invention.

An exemplary set of embodiments provides a method of creating dynamic subsets of larger equipment parts lists (EPLs). The method may include receiving a search request that includes an associated failure code and an asset type. The method can further include providing an equipment parts list (EPL) for the asset type, and retrieving sub-lists of the EPL based on actual previous searches which are associated with the failure code for the asset type. The method may further predicts which one of the plurality of sub-lists has the highest probability of being associated with the failure code for the asset type, and may presents the predicted sub-list of the EPL to a user.

Another set of embodiments provides systems. An exemplary system might comprise a system for creating dynamic subsets of larger EPLs. The system may include a computing device having a display device. The display device may be configured to display a user interface (UI) to a user. The computing device may further include an input device which is configured to receive a search request. The search request can include an associated failure code and an asset type. The computing device may further include a transmission module which is configured to transmit the search request. The system could further include a database which is configured to store EPLs and might further be configured to store and execute queries to generating sub-lists of the EPLs. Further, the system may include a processing center coupled with the computing device via the transmission module and coupled with the database. The processing center could be configured to receive the search request from the computing device, access the database to retrieve a plurality of sub-lists of an EPL which are associated with the failure code for the asset type, predict which one of the plurality of sub-lists that has the highest probability of being associated with the failure code, and present the predicted sub-list of the EPL to a user.

A further embodiment provides an apparatus including at least one processor for creating dynamic subsets of larger EPLs. The apparatus may include an asset classifier which is configured to assign an asset type to each of a plurality of assets. The apparatus might further include an EPL generator coupled with the asset classifier configured to generate EPL lists for each asset type. A failure code generator might be coupled with the asset classifier and may be configured to generate problem-cause-resolution (PCR) codes for each asset type. Furthermore, a probability determination unit could be coupled with the EPL generator and the failure code generator and may be configured to determine, based on an asset type and a PCR code associated with a request, which sub-list of an EPL has the highest probability of matching the request. The probability determination unit may further be configured to present the sub-list of the EPL to a user.

An embodiment for a set of instructions might comprise, inter alia, instructions to receive a search request that includes an associated failure code and an asset type. The instructions may further include providing an EPL for the asset type, and may retrieve sub-lists of the EPL based on previous search requests which are associated with the failure code for the asset type. The instructions might further predict which one of the plurality of sub-lists has the highest probability of being associated with the failure code for the asset type, and might present the predicted sub-list of the EPL to a user.

Hence, embodiments of the invention overcome a variety of shortcomings of previous solutions, including without limitation those described above, as well as others that will become apparent to one of skill in the art upon review of this disclosure.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components. Furthermore, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

FIG. 4 is a block diagram illustrating a relationship table in a database in accordance with various embodiments of the invention.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention involve utilizing failure data and statistics along with previous searches to enhance searching of parts, equipment and/or personnel. The present invention uses such data to probabilistically determine the resource items needed for a particular request based on what has been needed for the same or similar request in the past. Furthermore, the present invention dynamically generates customized views of an equipment parts list (EPL) based on problem-cause-resolution (PCR) codes presented with a current request.

Figure 1:
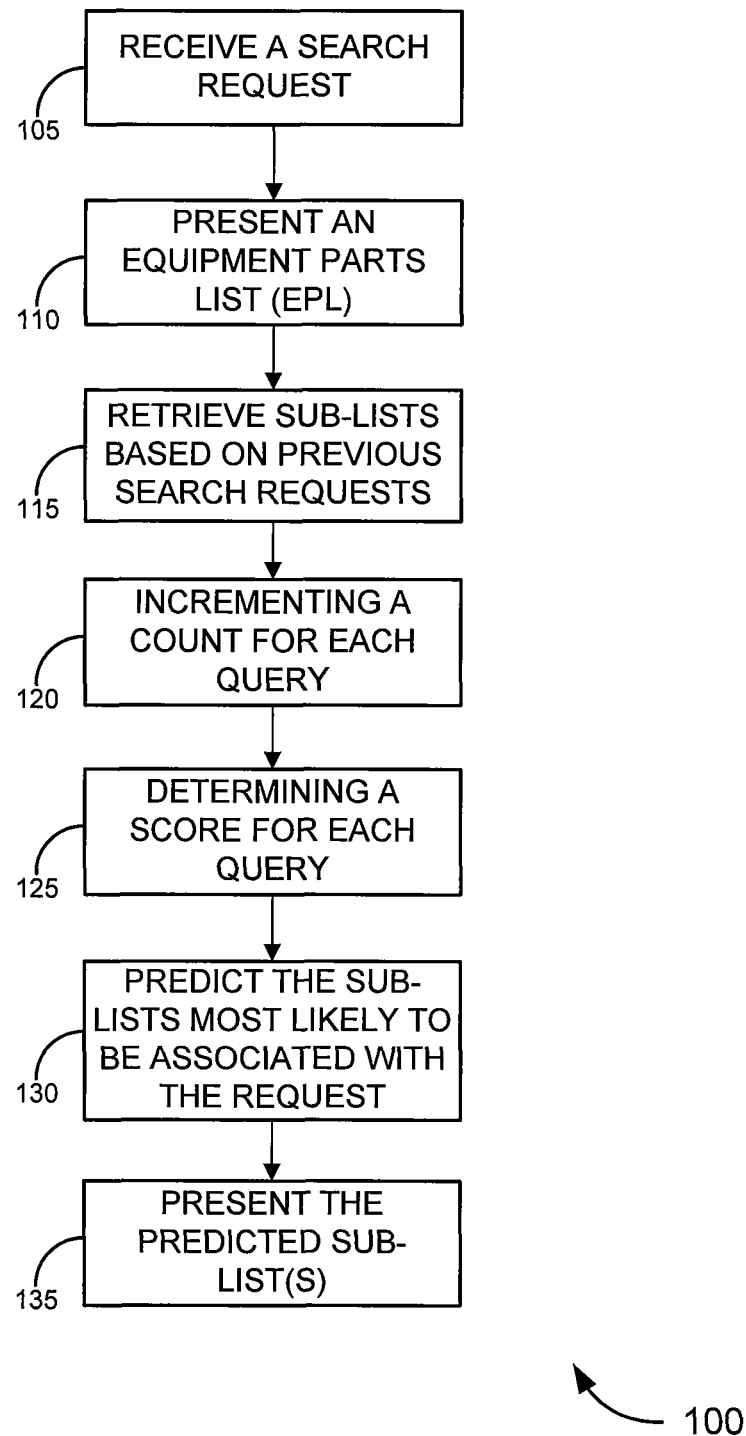
FIG. 1 is a process flow diagram illustrating a method of generating dynamic parts lists, in accordance with various embodiments of the invention.

FIG. 1 illustrates a method 100 according to one embodiment of the present invention. At process block 105, a search request which includes a target asset (or target asset type) is received. In one embodiment, the search request may be a search for parts (e.g., automotive parts, building materials, etc.), supplies (e.g., motor oil, steel girders, etc.), personnel (e.g., mechanics, crane operators, etc.) and/or equipment (e.g., wrenches, hydraulic lifts, etc.) needed to complete to a work order. In one embodiment, a variety of lists may be maintained for each asset type (e.g., automobiles, buildings, etc.). Such lists, merely by way of example, may be referred to as equipment parts lists (EPLs). For example, an EPL for automobiles may include motor oils, windshields, wrenches, tires, etc., whereas an EPL for a building may include steel girders, cranes, cement, etc.

In one embodiment, each EPL may include all of the possible parts, supplies, personnel and equipment that may be used by an asset associated with the asset type of the EPL. Consequently, an EPL may be a comprehensive list for a given asset type. In a further embodiment, the request may also include PCR codes and/or failure information. For example, a user may input in the request that the problem is that the truck's engine overheats (i.e., the problem code in the PCR code). Additionally, the user may input in the request that the cause of the overheating is a coolant leak (i.e., the cause code in the PCR code). The request may include more or less information which the system may then use to determine the most suitable EPL to use based on the work order presented by the user.

At process block 110, the EPL associated with the asset type of the request is retrieved. The EPL may be stored in, for example, a database; however, any suitable storage location may be used. At process block 115, sub-lists of the retrieved EPL are retrieved based on previous searches and/or failure tracking data. In one embodiment, the sub-lists may be generated by executing a query on the EPL. The query may be generated based on key relationships as described in, for example, table 400 in FIG. 4. Furthermore, the query may be implemented using relational algebra, SQL commands, etc.

Referring back to the previous example, if the problem is identified as "engine overheats", such a search may return a large number of possible sub-lists of the "truck" EPL (e.g., mechanical sub-system, cooling sub-system, etc.). Thus, with such a large number of sub-lists to search, a user may have difficulties properly identifying the correct EPL sub-list for the particular problem they are attempting to resolve. Thus, previous searches and failures may be used to further narrow the possible sub-lists of the EPL.

In one embodiment, data gathered by previous search requests and failures may be accessed in order to narrow the possible matches to a user's current search request. At process block 120, each instance a query is executed to generate a sub-list, a count for that query may be incremented (e.g., count column 415 in FIG. 4). The count may then be used to calculate a score associated with each query (process block 125). As more search requests are generated and more data is gathered, searching becomes more accurate and dynamic. The searching system learns over time by gathering more and more search and failure data and drawing on that data when predicting subsequent sub-list matches to searches.

Figure 5:
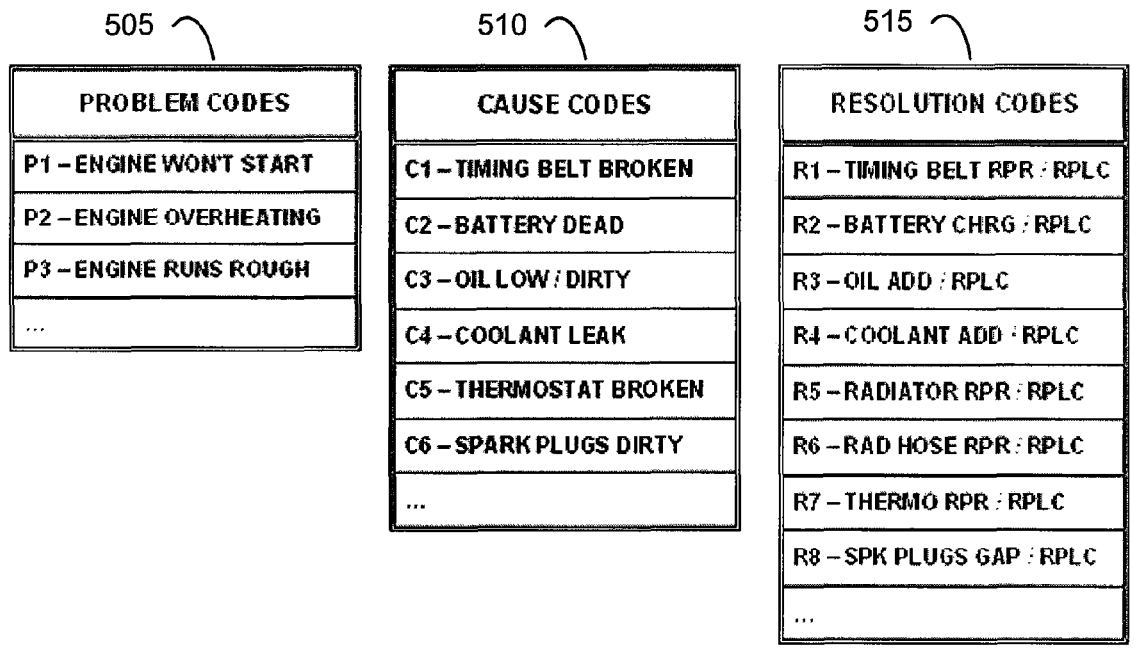
FIG. 5 is a block diagram illustrating failure analysis codes identifying various problems, causes, and resolutions tracking in accordance with various embodiments of the invention.

According to one embodiment of the invention, FIG. 5 illustrates failure tracking tables which include failure tracking data to be used when predicting subsequent search results. In one embodiment, failure analysis codes may be initially created and maintained in linear lists (e.g., problem codes 505, cause codes 510, and resolution codes 515) organized by code types. The lists can then be linked, for example, from problem to cause(s), cause to resolution(s), in order to form hierarchical tree structures of related codes.

Referring back to FIG. 1, at process block 130, the sub-lists that are most likely associated with the current search request are determined. In one embodiment, statistical filtering may be used to determine the most likely sub-lists. Referring again to the above "overheating" example, if based on previous searches 95% of the time overheating is the problem presented in the search request, a given sub-list (e.g., replace coolant sub-list, replace radiator hose sub-list, replace thermostat sub-list, etc.) is used to solve the problem, then that sub-list may be presented to the user. Thus, by utilizing previous search and failure data, a narrowed (or filtered) view of the asset EPL may be presented to the user.

Further, based on the information presented in the search request, additional sub-lists may also have a high probability being the correct sub-list (e.g., a list with a 92% probability or 90% probability, etc.). In one embodiment, a threshold probability may be used in order to filter out low probability sub-lists (e.g., only 65% probability matches and above are presented). Furthermore, the sub-lists may be ordered in descending order based on their corresponding score, such that the most relevant sub-lists may be displayed first in the list of sub-lists.

In a further embodiment, the user may also enter a cause code for "coolant leak" in addition to the problem code for "overheating." The addition of the cause code may further narrow the scope of the possible sub-lists that may be presented. Consequently, the predicted sub-lists become even more accurate. Thus, for example, in this situation, a sub-list associated with replacing the radiator hose based on previous search and failure data may be correct 98% of the time. In addition to the problem code for "engine overheating" and the cause code for "coolant leak," the user may also enter a resolution code for "replace radiator hose." Thus, the possible sub-list presented would then be even narrower. In one embodiment, in that situation only a single sub-list may be presented.

At process block 135, the predicted sub-list(s) is presented for the user. The sub-lists may be ordered, for example, based on their accuracy percentage. Once items from the sub-list are selected and used, the data associated with the items and failures are stored for use in predicting the next search request. Furthermore, the counter for the query that generated the sub-list may be incremented. In addition, or in the alternative, a default EPL sub-list may be associated with each problem code, cause code or resolution code and/or any combination of the codes.

Figure 2:
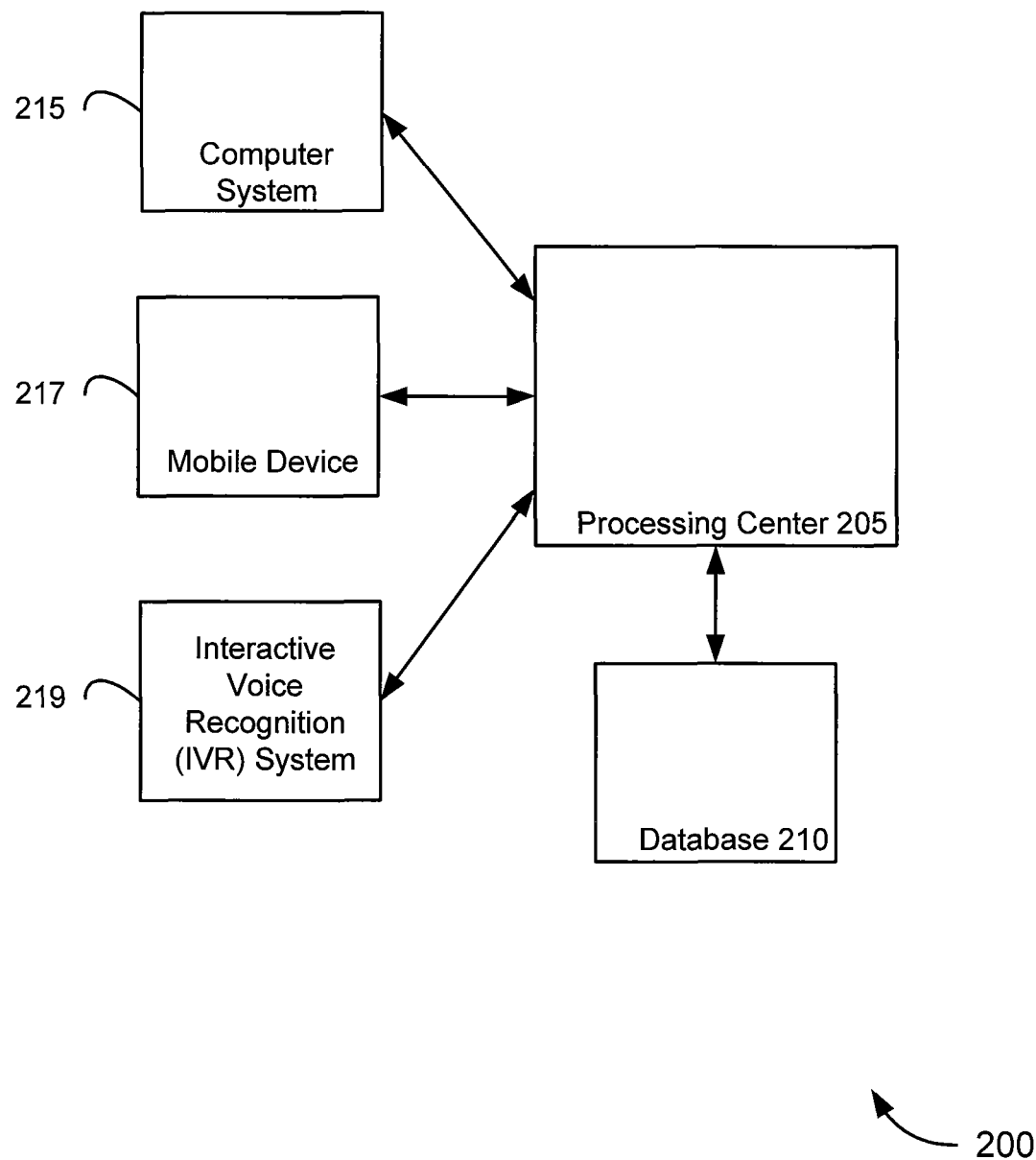
FIG. 2 is a block diagram illustrating a system for generating dynamic parts lists, in accordance with various embodiments of the invention.

Turning now to FIG. 2 which illustrates a system 200 which may be configured to implement embodiments of the present invention. In one embodiment, system 200 includes a processing center 205. Processing center 205 may be configured to implement method 100 illustrated in FIG. 1; however, processing center 205 may implement other methods and/or operations. In a further embodiment, processing center 205 may be configured to receive a search request or work order from any one of computer system 215 (e.g., a personal computer, a laptop computer, etc.), mobile device 217 (e.g., portable computer, handheld computing device, cellular telephone, etc.) or interactive voice recognition (IVR) system 219.

Merely by way of example, a technician in an auto repair shop may use a handheld device with a graphical user interface (GUI) to input a search request to be transmitted to processing center 205. The request may be transmitted over any suitable medium (e.g., on a local area network, a wide area network, a wireless link, a WiFi link, etc.). In one embodiment, the technician may be attempting to determine the parts, supplies and/or equipment needed to perform an oil change. Upon receipt of the request, processing center 205 may access database 210 in order to retrieve previous search requests and failure data.

In one embodiment, database 210 may include queries that correspond to PCR codes which, when run on database 210, generate a sub-list of an EPL related to the PCR code. The sub-lists may provide the parts, equipment, tools, etc., required to complete the repair, service, etc. In response to processing center 205's access to database 210, database 210 may transmit to processing center 205 sub-lists associated with previous searches and failures which potentially correspond to the current search request. In addition, database 210 may transmit statistical data related to each of the sub-lists (e.g., counter data associated with the query used to generate the sub-list).

In a further embodiment, processing center 205 may utilize the data received from database 210 in conjunction with the data received in the search request to predict the most likely sub-lists to be used for the current request. Processing center 205 may then transmit the possible sub-lists to the technician for viewing on the GUI of the handheld device, or as an audible response in the IVR system. Consequently, the technician is presented with a list of likely candidates for the search request, which the user can then select the correct sub-list for the work order.

Figure 3:
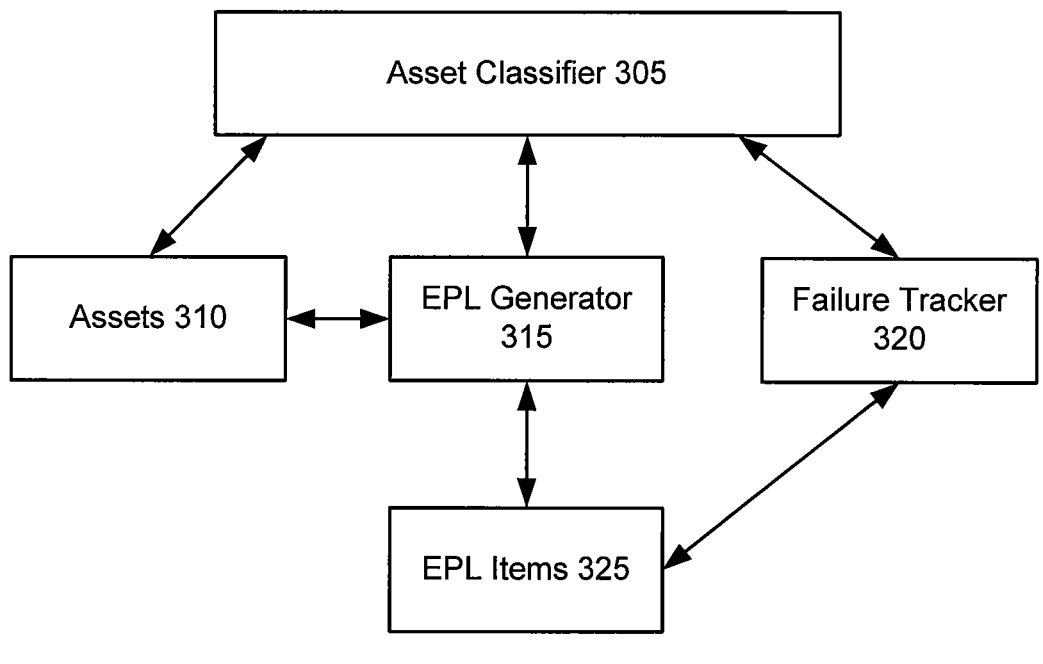
FIG. 3 is a block diagram illustrating an apparatus for generating dynamic parts lists, in accordance with various embodiments of the invention.

Turning now to FIG. 3 which illustrates which illustrates an apparatus 300 for generating dynamic EPLs. In one embodiment, apparatus 300 may include an asset classifier 305. Asset classifier 305 may be configured to classify assets 310 into various subcategories. For example, assets may be assigned to a broad "type" classification and then into a "sub-type", "manufacturer", "manufacturer's identification (ID)", "make", "model", "section", etc. A type may be a classification for all "trucks," while the sub-type is narrowed to "pick-up trucks" which may be further narrowed to a specific manufacturer (e.g., Honda™, Toyota™, Ford™, etc.).

Apparatus 300 may further include an EPL generator 315 which is connected to asset classifier 305 and assets 310. EPL generator 315 may be configured to generate EPLs for each asset type classification generated by asset classifier 305. In one embodiment, EPL generator 315 may access EPL items 325 (e.g., parts, supplies, equipment, personnel, etc.) to populate the generated EPLs.

In a further embodiment, apparatus 300 may include a failure tracker 320. Failure tracker 320 may be configured to track the association of PCR codes with EPL items 325. More particularly, failure tracker 320 may track which item(s) within a sub-list(s) of EPLs for a given asset are commonly used in connection with certain PCR or failure codes. The tracking information gathered by failure tracker 320 may then be used, for example, to predict likely sub-lists to present to a user based on the user's PCR code input included in their requests.

Turning now to FIG. 4 which illustrates a relationship table 400 between the information tracked by failure tracker 320 (FIG. 3) and EPL items 325 (FIG. 3). In one embodiment, table 400 may include an EPL item keys column 405, which may include EPL IDs 420 and Item IDs 425. EPL IDs 420 may be used to identify each EPL, and Item IDs 425 may be used to identify each item included in an EPL. Table 400 may further include a failure tracking keys column 410, which includes a code type 430 and a code ID 440. In one embodiment, code type 430 may be an combination of a problem, cause and/or resolution code, and code ID 440 may be used to identify each individual code type.

In order to determine a correlation between EPL items and failure codes, EPL item keys 405 and failure tracking keys 410 used with, for example, SQL aggregate functions (e.g., open joins, etc.) to extract data from table 400. Subsequently, each time an entry in table 400 is used (or accessed) a count 415 may be incremented to track the number of occurrences of that entry. The counts may then be used when predicting the appropriate sub-list to use for a particular search request.

Figure 6:
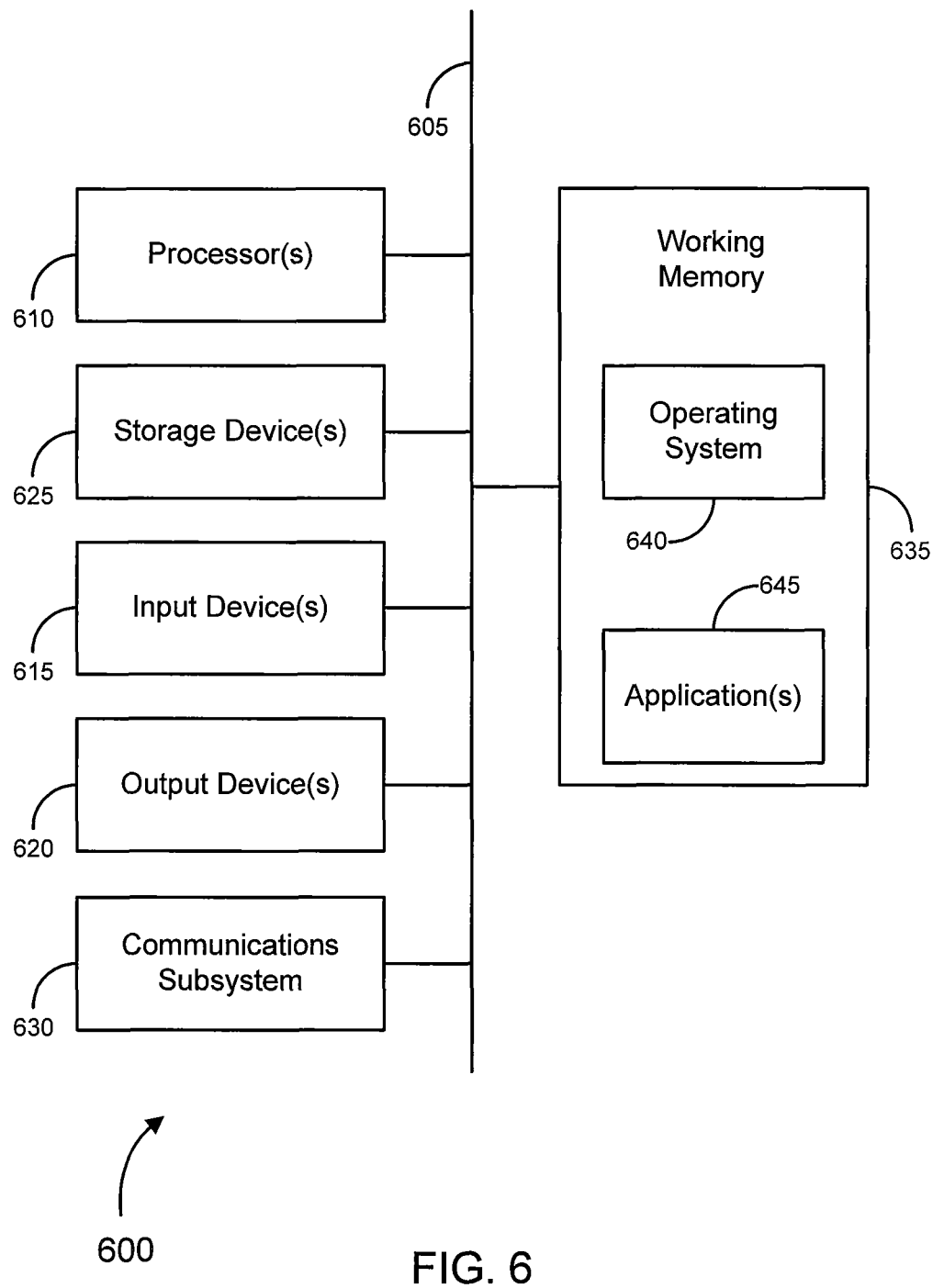
FIG. 6 is a generalized schematic diagram illustrating a computer system, in accordance with various embodiments of the invention.

FIG. 6 provides a schematic illustration of one embodiment of a computer system 600 that can perform the methods of the invention, as described herein, and/or function as, for example, processing center 205 (FIG. 2). It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including without limitation, one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640 and/or other code, such as one or more application programs 645, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 600, various machine-readable media might be involved in providing instructions/code to processor(s) 610 for execution and/or might be used to store and/or carry such instructions/code. In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation, dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
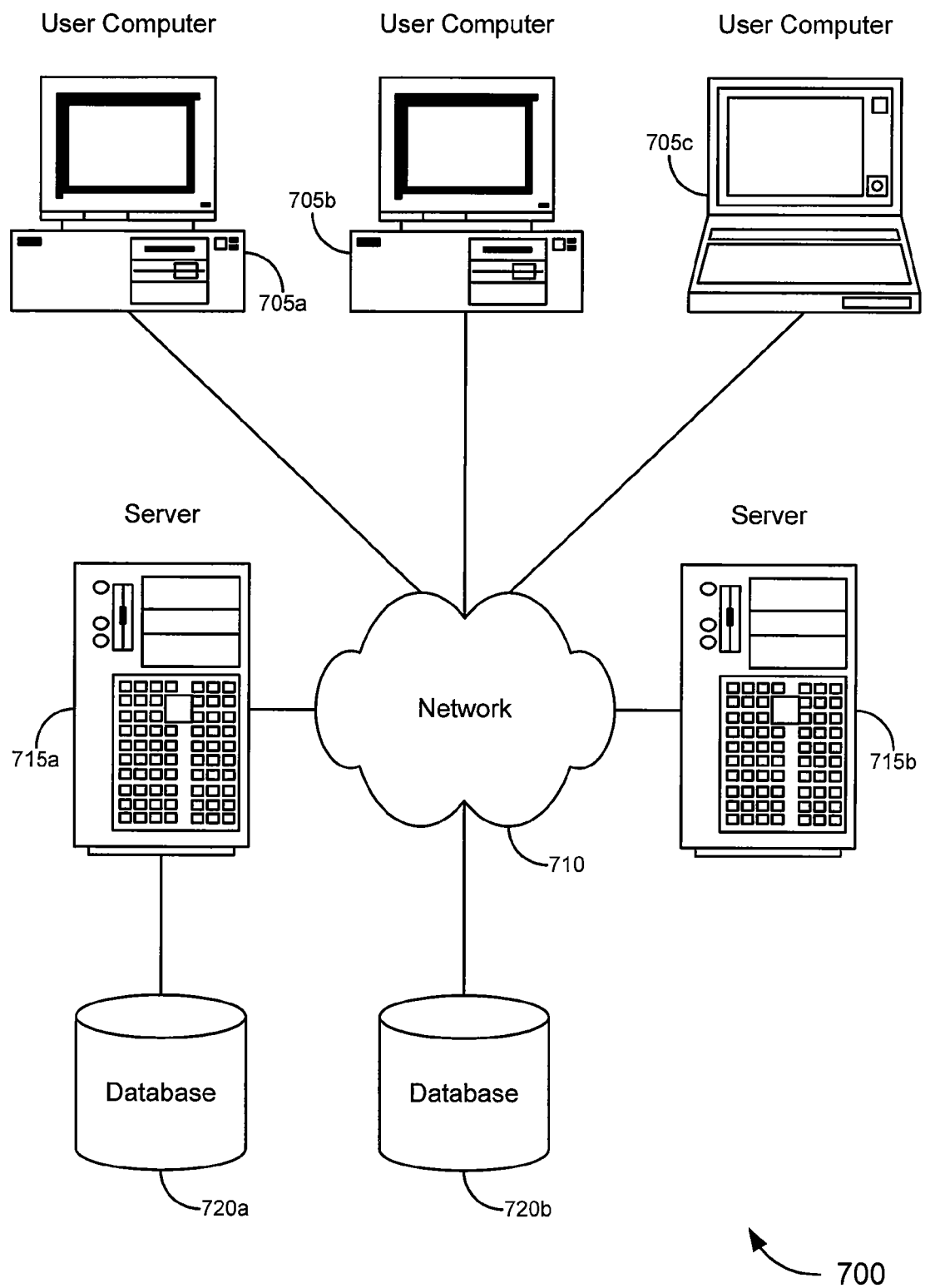
FIG. 7 is a block diagram illustrating a networked system of computers, which can be used in accordance with various embodiments of the invention.

A set of embodiments comprises systems for generating dynamic parts lists. Merely by way of example, FIG. 7 illustrates a schematic diagram of a system 700 that can be used in accordance with one set of embodiments. The system 700 can include one or more user computers 705. The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant, capable of communicating via a network (e.g. the network 710 described below) and/or displaying and navigating web pages or other types of electronic documents. Although the exemplary system 700 is shown with three user computers 705, any number of user computers can be supported.

Certain embodiments of the invention operate in a networked environment, which can include a network 710. The network 710 can be any type of network familiar to those skilled in the art that can support data communications using any of a variety of commercially-available protocols, including without limitation TCP/IP, SNA, IPX, AppleTalk™, and the like. Merely by way of example, the network 710 can be a local area network ("LAN"), including without limitation an Ethernet™ network, a Token-Ring™ network and/or the like; a wide-area network; a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a web server, which can be used to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more file and/or application servers, which can include one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 705 and/or another server 715. In some embodiments, an application server can create web pages dynamically for displaying the information in accordance with embodiments of the invention, such as the user interface of computer system 215 (FIG. 2), mobile device 217 (FIG. 2) and the like. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement methods of the invention incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for processing search requests by identifying sub-lists of parts lists, the method comprising:

for each type of a plurality of types of assets:
generating a plurality of code components, each code component of the plurality of code components representing a problem with an asset, a cause of a problem with an asset, or a resolution of a problem with an asset;
generating a plurality of codes, each code of the plurality of codes representing a combination of multiple code components of the plurality of code components;
for each code of the plurality of codes, generating, in a SQL-compatible usage data store, a count variable associated with the code and type;

receiving, at a computer system, a plurality of first search requests, each first search request of the plurality of first search requests being received from a corresponding first user device;

determining, by the computer system, that each first search request of the plurality of first search requests is associated with:
a particular type of asset of the plurality of types of assets; and
one or more particular code components, each of the one or more particular code components representing at least one of a problem with an asset, a cause of a problem with an asset, or a resolution of a problem with an asset;

identifying a parts list that identifies a plurality of parts that corresponds to the particular type of asset, each part of the plurality of parts including an asset, supply or equipment;

for each first search request of the plurality of first search requests:
facilitating a presentation of one or more sub-lists of the parts list at the corresponding first user device, each sub-list of the one or more sub-lists being a subset of the plurality of parts;
receiving a selection communication from the corresponding first user device that identifies a part from a sub-list of the one or more sub-lists;
identifying a code component corresponding to the part identified via the selection communication;
generating, based on the one or more particular code components and the code component corresponding to the part identified via the selection communication, a code that represents a combination of the one or more particular code components and the code component corresponding to the part identified via the selection communication;
incrementing the count variable associated with the code and the particular type of asset in the SQL-compatible usage data store;

receiving, at the computer system, a second search request from a second user device that corresponds to an asset and the one or more particular code components;

classifying, by the computer system, the asset identified in the second search request as being of the particular type of asset;

extracting, from the SQL-compatible usage data store, a plurality of count variables using one or more SQL functions, each count variable of the plurality of count variables corresponding to a combination of the one or more particular code components with at least one other code component;

for each of the plurality of count variables, generating, by the computer system, a score for a sub-list of the parts list based on the count variable, each part identified in the sub-list corresponding to each of the one or more particular code components and to each of the at least one other code component represented in the count variable;

performing, by the computer system and based on the scores, a statistical filtering of a plurality of sub-lists of the parts lists that indicates that a first sub-list of the parts list is more responsive to the second search request than a second sub-list of the parts list, wherein the first sub-list is associated with a higher score than is the second sub-lists; and facilitating a presentation that identifies one or more parts identified in the first sub-list.

2. The method for processing search requests by identifying sub-lists of parts lists as recited in claim 1, further comprising:

generating the first sub-list by querying the parts list with the at least one other code component corresponding to a count variable of the plurality of count variables.

3. The method for processing search requests by identifying sub-lists of parts lists as recited in claim 1, wherein the presentation does not include at least one part identified in the second sub-list.

4. The method for processing search requests by identifying sub-lists of parts lists as recited in claim 1, further comprising:

generating, based on the scores, an order for presenting identifiers of multiple sub-lists, the multiple sub-lists including the first sub-list and the second sub-list, and the order indicating that the first sub-list is to be presented before the second sub-list.

5. The method for processing search requests by identifying sub-lists of parts lists as recited in claim 1, further comprising, for each type of the plurality of types of assets:

populating a first data structure with first code components of the plurality of code components, the first data structure being associated with a problem with an asset;

populating a second data structure with second code components of the plurality of code components, the second data structure being associated with a cause or resolution of a problem with an asset; and establishing links between the first data structure and the second data structure, such that each of the first code components is associated with one or more second code components.

6. The method for processing search requests by identifying sub-lists of parts lists as recited in claim 5, wherein the links are configured to establish a hierarchical structure between code components in the first data structure and the second data structure.

7. The method for processing search requests by identifying sub-lists of parts lists as recited in claim 1, wherein dynamically predicting that the first sub-list of the parts list is more responsive to the second search request than the second sub-list of the parts list includes determining that the score for the first sub-list exceeds a defined threshold and that the score for the second sub-list does not exceed the defined threshold.

8. A system for processing search requests by identifying sub-lists of parts lists, the system comprising:

one or more processors; and a memory coupled with and readable by the one or more processors and storing therein a set of instructions which, when executed by the one or more processors, causes the one or more processors to perform actions including:

for each type of a plurality of types of assets:

generating a plurality of code components, each code component of the plurality of code components representing a problem with an asset, a cause of a problem with an asset, or a resolution of a problem with an asset;

generating a plurality of codes, each code of the plurality of codes representing a combination of multiple code components of the plurality of code components;

for each code of the plurality of codes, generating, in a SQL-compatible usage data store, a count variable associated with the code and type;

receiving a plurality of first search requests, each first search request of the plurality of first search requests being received from a corresponding first user device;

determining that each first search request of the plurality of first search requests is associated with:

a particular type of asset of the plurality of types of assets; and one or more particular code components, each of the one or more particular code components representing at least one of a problem with an asset, a cause of a problem with an asset, or a resolution of a problem with an asset;

identifying a parts list that identifies a plurality of parts that corresponds to the particular type of asset, each part of the plurality of parts including an asset, supply or equipment;

for each first search request of the plurality of first search requests:

facilitating a presentation of one or more sub-lists of the parts list at the corresponding first user device, each sub-list of the one or more sub-lists being a subset of the plurality of parts;

receiving a selection communication from the corresponding first user device that identifies a part from a sub-list of the one or more sub-lists;

identifying a code component corresponding to the part identified via the selection communication;

generating, based on the one or more particular code components and the code component corresponding to the part identified via the selection communication, a code that represents a combination of the one or more particular code components and the code component corresponding to the part identified via the selection communication;

incrementing the count variable associated with the code and the particular type of asset in the SQL-compatible usage data store;

receiving a second search request from a second user device that corresponds to an asset and the one or more particular code components;

classifying the asset identified in the second search request as being of the particular type of asset;

extracting, from the SQL-compatible usage data store, a plurality of count variables using one or more SQL functions, each count variable of the plurality of count variables corresponding to a combination of the one or more particular code components with at least one other code component;

for each of the plurality of count variables, generating a score for a sub-list of the parts list based on the count variable, each part identified in the sub-list corresponding to each of the one or more particular code components and to each of the at least one other code component represented in the count variable;

performing, based on the scores, a statistical filtering of a plurality of sub-lists of the parts lists that indicates that a first sub-list of the parts list is more responsive to the second search request than a second sub-list of the parts list, wherein the first sub-list is associated with a higher score than is the second sub-lists; and facilitating a presentation that identifies one or more parts identified in the first sub-list.

9. The system for processing search requests by identifying sub-lists of parts lists as recited in claim 8, the actions further including:

generating the first sub-list by querying the parts list with the at least one other code component corresponding to a count variable of the plurality of count variables.

10. The system for processing search requests by identifying sub-lists of parts lists as recited in claim 8, wherein the presentation does not include at least one part identified in the second sub-list.

11. The system for processing search requests by identifying sub-lists of parts lists as recited in claim 8, the actions further including:

generating, based on the scores, an order for presenting identifiers of multiple sub-lists, the multiple sub-lists including the first sub-list and the second sub-list, and the order indicating that the first sub-list is to be presented before the second sub-list.

12. The system for processing search requests by identifying sub-lists of parts lists as recited in claim 8, the actions further including, for each type of the plurality of types of assets:

populating a first data structure with first code components of the plurality of code components, the first data structure being associated with a problem with an asset;

populating a second data structure with second code components of the plurality of code components, the second data structure being associated with a cause or resolution of a problem with an asset; and establishing links between the first data structure and the second data structure, such that each of the first code components is associated with one or more second code components.

13. The system for processing search requests by identifying sub-lists of parts lists as recited in claim 12, wherein the links are configured to establish a hierarchical structure between code components in the first data structure and the second data structure.

14. The system for processing search requests by identifying sub-lists of parts lists as recited in claim 8, wherein dynamically predicting that the first sub-list of the parts list is more responsive to the second search request than the second sub-list of the parts list includes determining that the score for the first sub-list exceeds a defined threshold and that the score for the second sub-list does not exceed the defined threshold.

15. A computer-program product tangibly embodied in a non-transitory machine-readable storage medium, including instructions configured to cause one or more data processors to perform actions including:

for each type of a plurality of types of assets:
generating a plurality of code components, each code component of the plurality of code components representing a problem with an asset, a cause of a problem with an asset, or a resolution of a problem with an asset;
generating a plurality of codes, each code of the plurality of codes representing a combination of multiple code components of the plurality of code components;
for each code of the plurality of codes, generating, in a SQL-compatible usage data store, a count variable associated with the code and type;

receiving a plurality of first search requests, each first search request of the plurality of first search requests being received from a corresponding first user device;

determining that each first search request of the plurality of first search requests is associated with:
a particular type of asset of the plurality of types of assets; and
one or more particular code components, each of the one or more particular code components representing at least one of a problem with an asset, a cause of a problem with an asset, or a resolution of a problem with an asset;

identifying a parts list that identifies a plurality of parts that corresponds to the particular type of asset, each part of the plurality of parts including an asset, supply or equipment;

for each first search request of the plurality of first search requests:
facilitating a presentation of one or more sub-lists of the parts list at the corresponding first user device, each sub-list of the one or more sub-lists being a subset of the plurality of parts;
receiving a selection communication from the corresponding first user device that identifies a part from a sub-list of the one or more sub-lists;
identifying a code component corresponding to the part identified via the selection communication;
generating, based on the one or more particular code components and the code component corresponding to the part identified via the selection communication, a code that represents a combination of the one or more particular code components and the code component corresponding to the part identified via the selection communication;
incrementing the count variable associated with the code and the particular type of asset in the SQL-compatible usage data store;

receiving a second search request from a second user device that corresponds to an asset and the one or more particular code components;

classifying the asset identified in the second search request as being of the particular type of asset;

extracting, from the SQL-compatible usage data store, a plurality of count variables using one or more SQL functions, each count variable of the plurality of count variables corresponding to a combination of the one or more particular code components with at least one other code component;

for each of the plurality of count variables, generating a score for a sub-list of the parts list based on the count variable, each part identified in the sub-list corresponding to each of the one or more particular code components and to each of the at least one other code component represented in the count variable;

performing, based on the scores, a statistical filtering of a plurality of sub-lists of the parts lists that indicates that a first sub-list of the parts list is more responsive to the second search request than a second sub-list of the parts list, wherein the first sub-list is associated with a higher score than is the second sub-lists; and facilitating a presentation that identifies one or more parts identified in the first sub-list.

16. The computer-program product as recited in claim 15, the actions further including:

generating the first sub-list by querying the parts list with the at least one other code component corresponding to a count variable of the plurality of count variables.

17. The computer-program product as recited in claim 15, wherein the presentation does not include at least one part identified in the second sub-list.

18. The computer-program product as recited in claim 15, the actions further including:

generating, based on the scores, an order for presenting identifiers of multiple sub-lists, the multiple sub-lists including the first sub-list and the second sub-list, and the order indicating that the first sub-list is to be presented before the second sub-list.

19. The computer-program product as recited in claim 15, the actions further including, for each type of the plurality of types of assets:

populating a first data structure with first code components of the plurality of code components, the first data structure being associated with a problem with an asset;

populating a second data structure with second code components of the plurality of code components, the second data structure being associated with a cause or resolution of a problem with an asset; and establishing links between the first data structure and the second data structure, such that each of the first code components is associated with one or more second code components.

20. The computer-program product as recited in claim 19, wherein the links are configured to establish a hierarchical structure between code components in the first data structure and the second data structure.

\* \* \* \* \*

UNITED STATES PATENT AND TRADEMARK OFFICE
CERTIFICATE OF CORRECTION

PATENT NO.       : 9,785,893 B2
APPLICATION NO.  : 11/860915
DATED            : October 10, 2017
INVENTOR(S)      : Riksheim et al.

It is certified that error appears in the above-identified patent and that said Letters Patent is hereby corrected as shown below:

In the Specification

In Column 8, Lines 20-21, delete "and or" and insert -- and/or --, therefor.

Signed and Sealed this
Twenty-second Day of May, 2018

Andrei Iancu
*Director of the United States Patent and Trademark Office*